United States Patent
Ozawa

(10) Patent No.: US 8,181,354 B2
(45) Date of Patent: *May 22, 2012

(54) INCLINATION POSITION SENSOR AND INCLINATION POSITION SENSOR MANUFACTURING METHOD

(75) Inventor: Nobuo Ozawa, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,602

(22) Filed: Apr. 4, 2011

(65) Prior Publication Data

US 2011/0179657 A1 Jul. 28, 2011

Related U.S. Application Data

(63) Continuation of application No. 12/073,971, filed on Mar. 12, 2008, now Pat. No. 7,937,846.

(30) Foreign Application Priority Data

Mar. 27, 2007 (JP) .................................. 2007-082358

(51) Int. Cl.
*G01C 9/02* (2006.01)
*H01H 35/02* (2006.01)
*H01H 11/04* (2006.01)

(52) U.S. Cl. ...................................... 33/365; 33/366.26

(58) Field of Classification Search .................... 33/365, 33/366.11, 366.12, 366.13, 366.14, 366.21, 33/366.22, 366.24, 366.25, 366.26, 366.27; 200/61.57, 277

See application file for complete search history.

(56) References Cited

U.S. PATENT DOCUMENTS

| | | | |
|---|---|---|---|
| 4,493,155 A | 1/1985 | Comeau et al. | |
| 4,866,850 A | 9/1989 | Kelly et al. | |
| 5,148,604 A | 9/1992 | Bantien | |
| 5,261,279 A | 11/1993 | Wolf et al. | |
| 5,410,113 A | 4/1995 | Mielke | |
| 5,627,316 A | 5/1997 | De Winter et al. | |
| 6,505,409 B2 | 1/2003 | Toda et al. | |
| 6,802,132 B1 | 10/2004 | Olson | |
| 7,649,150 B2 | 1/2010 | Masuda | |
| 7,937,846 B2 * | 5/2011 | Ozawa ........................... | 33/365 |
| 2002/0007677 A1 | 1/2002 | Coates et al. | |
| 2007/0240510 A1 | 10/2007 | Kimino | |
| 2009/0266168 A1 | 10/2009 | Shimase | |
| 2011/0072673 A1 * | 3/2011 | Lai .................................. | 33/365 |

FOREIGN PATENT DOCUMENTS

| | | |
|---|---|---|
| DE | 3238915 A1 | 4/1984 |
| EP | 537812 A2 | 4/1993 |
| GB | 2403067 A | 12/2004 |
| JP | 02223119 A | 9/1990 |
| JP | 07-319041 | 12/1995 |
| JP | 10149753 A | 6/1998 |
| JP | 2001-110292 | 4/2001 |
| JP | 2002197953 A | 7/2002 |

(Continued)

Primary Examiner — Richard A. Smith
(74) Attorney, Agent, or Firm — Rabin & Berdo, PC

(57) ABSTRACT

An inclination position sensor where, on a substrate on which wires are formed, plural electrodes electrically connected to the wires are disposed, a conductive ball that can simultaneously contact at least two of the plural electrodes is disposed, an enclosure that covers the plural electrodes and the conductive ball is disposed, and a circular arc is formed in places of the electrodes that contact the conductive ball.

15 Claims, 8 Drawing Sheets

FOREIGN PATENT DOCUMENTS

| | | |
|---|---|---|
| JP | 2004055316 A | 2/2004 |
| JP | 2004171797 A | 6/2004 |
| JP | 2004177388 A | 6/2004 |
| JP | 2005-222743 | 8/2005 |
| JP | 2005-267918 | 9/2005 |
| JP | 2006010590 A | 1/2006 |
| JP | 2006064685 A | 3/2006 |
| JP | 2006208342 A | 8/2006 |
| JP | 2007128870 A | 5/2007 |
| JP | 2009198270 A | 9/2009 |

* cited by examiner

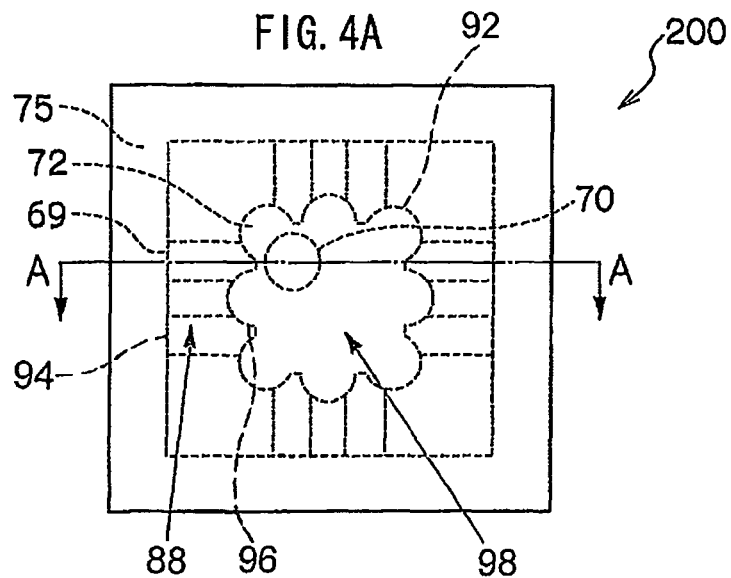
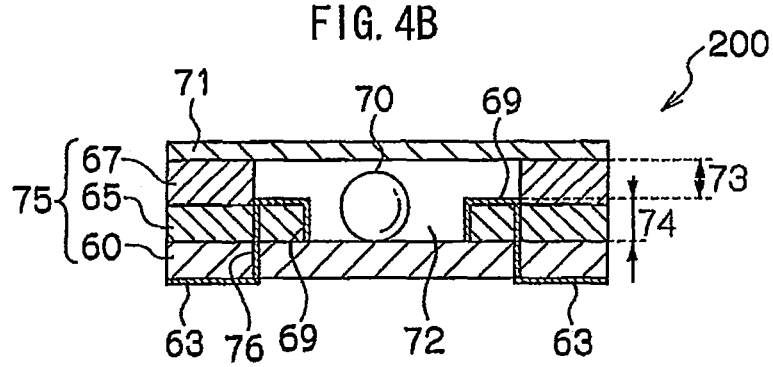
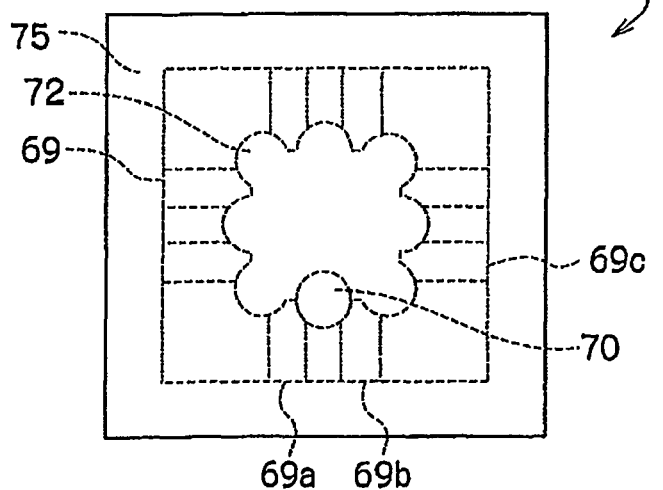

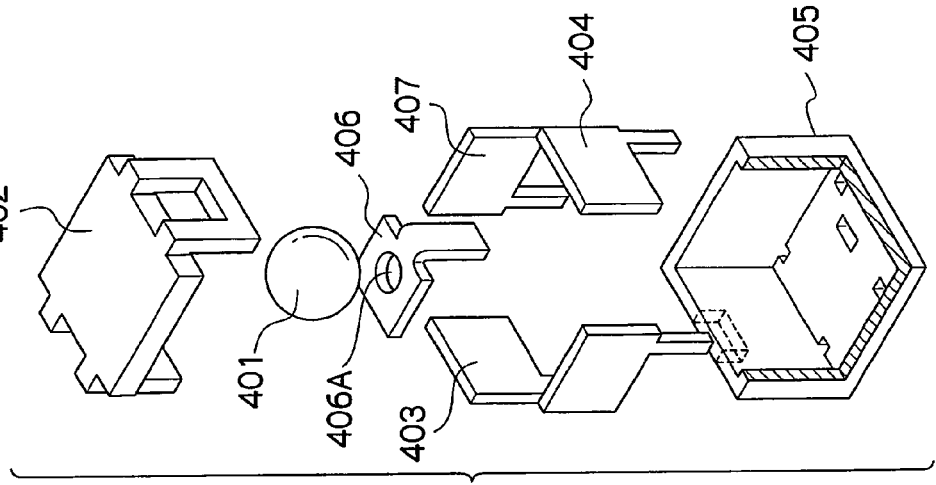
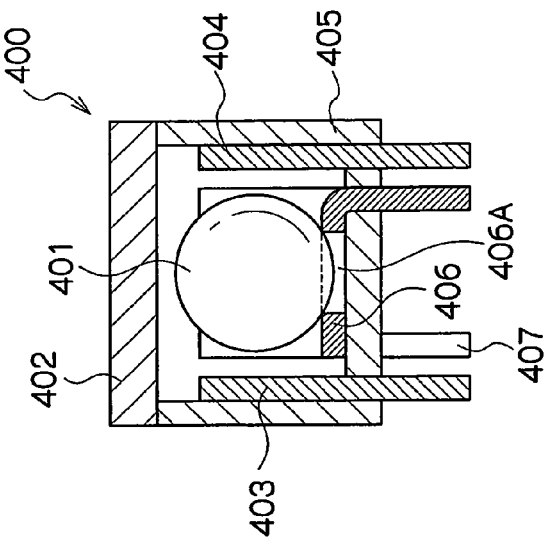

INCLINATION POSITION SENSOR AND INCLINATION POSITION SENSOR MANUFACTURING METHOD

This is a Continuation of U.S. application Ser. No. 12/073,971, filed Mar. 12, 2008 now U.S. Pat. No. 7,937,846, and allowed on Jan. 6, 2011, the subject matter of which is incorporated herein by reference.

CROSS-REFERENCE TO RELATED APPLICATION

This application claims priority under 35 USC 119 from Japanese Patent Application No. 2007-082358, the disclosure of which is incorporated by reference herein.

BACKGROUND OF THE INVENTION

1. Field of the Invention

The present invention relates to an inclination position sensor and a method of manufacturing the inclination position sensor, and in particular to an inclination position sensor that includes electrodes having a circular arc shape and an inclination position sensor manufacturing method that can manufacture an inclination position sensor by an assembly process or a package process.

2. Description of the Related Art

In recent years, as the diversification of electronic devices has progressed, the number of electronic devices that perform detection of inclination and vibration of a body using various inclination switches has increased.

As such an electronic device, a vertical-to-horizontal position detection part has been disclosed in order to recognize the vertical-to-horizontal position of a camera, for example (e.g., see Japanese Patent Application Publication (JP-A) No. 07-319041). This vertical-to-horizontal detection part will be described using FIGS. 7A and 7B.

FIGS. 7A and 7B are diagrams showing a camera as seen from the front. A bar 302 that is rotatable about a shaft 301 disposed orthogonal to the film plane is attached inside a camera body 300. The bar 302 is an insulator and configured such that it can rotate between a stopper 303 and an electric contact 304 that doubles as a stopper. It will be noted that an electric contact 305 is attached to the bar 302 on the side that contacts the electric contact 304.

When the camera body 300 is in an ordinary position, that is, a horizontal position, the bar 302 is in the state indicated by "A" shown in FIG. 7A where the electric contact 305 contacts the electric contact 304. When the camera body 300 is in a vertical position, the bar 302 is in the state indicated by "B" shown in FIG. 7B where the electric contact 305 does not contact the electric contact 304.

Thus, when lead wires attached to the electric contact 304 and the electric contact 305 are connected to input ports of a CPU 203 and the electric contact 304 and the electric contact 305 come into contact with each other, the CPU 203 can detect from the output signals thereof that the camera body 300 is in a horizontal position. As described above, the CPU 203 can detect whether the camera is in a vertical position or a horizontal position.

Further, an inclination position detection sensor that can detect an inclination position in eight directions (0°, 45°, 90°, 135°, 180°, 225°, 270° and 315°) has been proposed (e.g., see JP-A No. 2001-110292).

FIG. 8A is a cross-sectional diagram of the inclination position sensor 400, and FIG. 8B is an exploded perspective diagram of the inclination position sensor 400. As is apparent from FIG. 8B, the inclination position sensor 400 is configured by various parts.

However, the vertical-to-horizontal detection part 300 shown in FIGS. 7A and 7B has the problem that it can only perform simple vertical-to-horizontal detection and it cannot perform more detailed inclination position detection.

Further, the vertical-to-horizontal detection part 300 shown in FIGS. 7A and 7B and the inclination position sensor 400 shown in FIGS. 8A and 8B are parts comprising a combination of simple mechanical elements and have various problems in terms of making them compact, lightweight, and production-efficient.

Further, the inclination position sensor 400 shown in FIGS. 8A and 8B is a structure where a conductive ball 401 point-contacts corners of fixed contacts 403, 404 and 407, which has been a problem in that the inclination position sensor 400 breaks because of the impact of the conductive ball 401 and its lifespan becomes shorter.

SUMMARY OF THE INVENTION

The present invention has been made in view of these problems, and it is an object thereof to achieve the following object.

That is, it is an object of the present invention to provide an inclination position sensor whose mass productivity is improved and whose lifespan is lengthened and to provide a method of manufacturing the inclination position sensor.

As a result of extensive investigation, the present inventor discovered that the aforementioned problems can be solved by using the following inclination position sensor and inclination position sensor manufacturing method, and arrived at achieving the aforementioned object.

That is, an inclination position sensor of a first aspect of the invention includes a substrate on which wires are formed; plural electrodes electrically connected to the wires disposed on the substrate; a conductive ball that can simultaneously contact at least two of the plural electrodes disposed on the substrate; and an enclosure that covers the plural electrodes and the conductive ball, wherein a circular arc is formed where the electrodes contact the conductive ball.

According to the inclination position sensor of the first aspect of the invention, the side surfaces of the electrodes include circular arcs, so the impact that is imparted when the electrodes contact the conductive ball can be reduced in comparison to when the electrodes have cornered shapes, and it becomes difficult for the electrodes to break, so that the impact resistance can be improved. Moreover, by increasing the area of contact between the electrodes and the conductive ball, a stable electrically conductive state can be obtained.

In an inclination position sensor of a second aspect of the invention, an insulating liquid may fill a region covered by the enclosure in the first aspect.

According to the inclination position sensor of the second aspect of the invention, in addition to alleviating the impact as a result of the electrode shapes having a circular arc, an insulating liquid fills the movable region of the conductive ball covered by the enclosure, so the insulating liquid fulfills the role of a damper, the impact that is imparted to the electrodes by the conductive ball can be reduced, breakage and wear resulting from the conductive ball colliding with the electrodes is reduced, and the impact resistance can be improved.

An inclination position sensor manufacturing method of a third aspect of the invention includes: sequentially forming an oxide film and a metal film on a substrate to form wires;

forming an insulating film so as to cover the wires and the oxide film; forming, on the wires, electrodes having a circular arc; disposing, in a region enclosed by the electrodes, a conductive ball that can electrically interconnect at least two of the electrodes; and disposing an enclosure that covers the plural electrodes and the conductive ball.

According to the inclination position sensor manufacturing method of the third aspect of the invention, an inclination position sensor can be formed by an assembly process (wafer level CSP technique), so mass productivity is improved. Further, in the inclination position sensor manufactured by this manufacturing method, the side surface of the convex portion where the electrodes are formed has a circular arc shape, so the impact that is imparted when the electrodes contact the conductive ball can be reduced in comparison to when the electrodes have cornered shapes, and it becomes difficult for the electrodes to break, so the impact resistance can be improved. Moreover, by increasing the area of contact between the electrodes and the conductive ball, a stable electrically conductive state can be obtained.

An inclination position sensor manufacturing method of a fourth aspect of the invention includes: forming inner wires in a convex portion side surface of a multilayer substrate laminated so as to form a concavo-convex portion, and which convex portion side surface is a surface on a side that does not include a circular arc; forming electrodes on the surface of the side that does not include the circular arc of the convex portion side surface and on the convex portion upper surface such that the electrodes are electrically connected to the inner wires; disposing a conductive ball in the concave portion of the substrate; and forming an enclosure that covers the electrodes and the conductive ball.

According to the inclination position sensor manufacturing method of the fourth aspect of the invention, an inclination position sensor can be formed by a package process (substrate laminating technique), so mass productivity is improved. Further, in the inclination position sensor manufactured by this manufacturing method, the side surface of the convex portion where the electrodes are formed has a circular arc shape, so the impact that is imparted when the electrodes contact the conductive ball can be reduced in comparison to when the electrodes have cornered shapes, and it becomes difficult for the electrodes to break, so the impact resistance can be improved. Moreover, by increasing the area of contact between the electrodes and the conductive ball, a stable electrically conductive state can be obtained.

According to the present invention, there can be provided an inclination position sensor whose mass productivity is improved and whose lifespan is lengthened and a method of manufacturing the inclination position sensor.

BRIEF DESCRIPTION OF THE DRAWINGS

Preferred exemplary embodiments of the present invention will be described in detail based on the following figures, wherein:

FIG. 4A is a top view of an inclination position sensor that is embodiment 2 of the present invention;

FIG. 4B is a cross-sectional view along A-A in FIG. 4A of the inclination position sensor that is embodiment 2 of the present invention;

FIG. 4C is a top view showing when the inclination position sensor that is embodiment 2 of the present invention has been inclined in a vertical direction;

FIGS. 8A and 8B are cross-sectional views of another conventional inclination position sensor.

DETAILED DESCRIPTION OF THE INVENTION

Embodiments of this invention will be described below with reference to the drawings. It will be noted that the shapes, sizes and disposed relationships of the various configural components are only shown generally to the extent that this invention can be understood, and therefore this invention is not particularly limited. In the following description, specific materials, conditions and numeral conditions are sometimes used, but these are only preferred examples, and consequently this invention is not limited to these.

It will be noted that the inclination position sensor and the inclination position sensor manufacturing method of this invention can be formed using conventionally known materials such as a silicon substrate. Consequently, there are also instances where detailed description of these materials will be omitted.

The inclination position sensor of the present invention has a configuration where, on a substrate on which wires are formed, plural electrodes electrically connected to the wires are disposed, a conductive ball that can simultaneously contact at least two of the plural electrodes is disposed, an enclosure that covers the plural electrodes and the conductive ball is disposed, and a circular arc is formed in a place on the electrodes that contacts the conductive ball.

This inclination position sensor can be manufactured by an assembly process or a package process, and an inclination position sensor of embodiment 1, which is manufactured by an assembly process, and an inclination position sensor of embodiment 2, which is manufactured by a package process, will be described in detail below.

<Embodiment 1>
[Inclination Position Sensor of Embodiment 1]

Figure 1A:
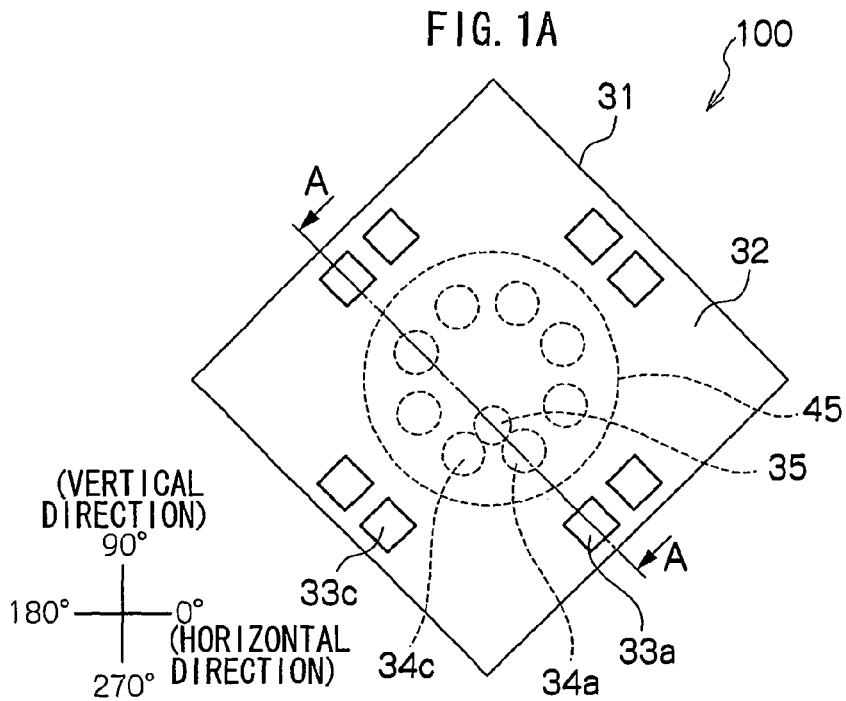
FIG. 1A is a top view of an inclination position sensor that is embodiment 1 of the present invention.
Figure 1B:
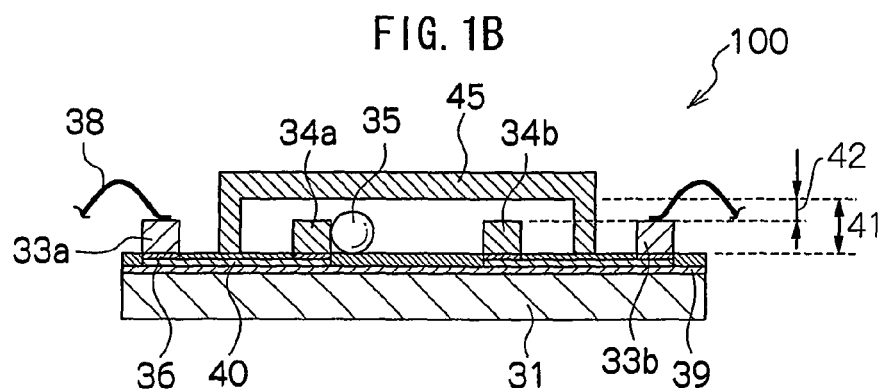
FIG. 1B is a cross-sectional view along A-A in FIG. 1A of the inclination position sensor that is embodiment 1 of the present invention.
Figure 1C:
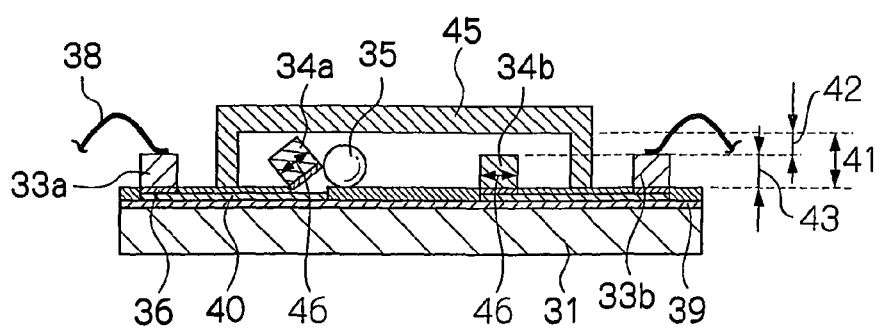
FIG. 1C is a cross-sectional view of the inclination position sensor that is embodiment 1 of the present invention and shows a state when an electrode has broken.

FIG. 1A is a top view of an inclination position sensor 100 of the present invention manufactured using a manufacturing method shown in FIGS. 3A to 3G to be described later. FIG. 1B is a cross-sectional view along A-A in FIG. 1A of the inclination position sensor 100 of the present invention. FIG. 1C is a cross-sectional view of the inclination position sensor 100 showing a state when an electrode has broken. It will be noted that FIG. 1A is a top view when an enclosure 45 has been made semi-transparent in order to make clear the internal structure of the inclination position sensor 100.

From FIG. 1A, it will be understood that the enclosure 45 is formed so as to cover eight electrodes 34 and a conductive ball 35. The intervals between each of the electrodes 34 are set to be intervals where the conductive ball 35 can simultaneously contact any arbitrary neighboring two of the electrodes 34.

Further, as for the principle of operation, as shown in FIG. 1A, for example, when the inclination position sensor 100 is inclined in a 45° direction, the conductive ball 35 contacts an electrode 34a and an electrode 34c. At this time, the electrode 34a and the electrode 35a are electrically interconnected because the conductive ball 35 has conductivity. An external detection circuit (not shown) connected to a terminal 33a and a terminal 33c discriminates this electrically connected state, whereby it can be detected that the inclination position sensor 100 is in a 315° direction, that is, that the electrode 34a and the electrode 34c are on the bottom.

In this manner, the inclination position sensor 100 shown in FIG. 1A can detect eight inclinations of 0°, 45°, 90°, 135°, 180°, 225°, 270° and 315°.

Further, turning now to FIG. 1B, an insulating film 32 is formed on the surface of a substrate 31 on which an oxide film 39 and wires 40 are sequentially formed. A seed layer 36 for forming the wires 40 and the electrodes 34 is formed thereon, the terminal 33a and a terminal 33b for leading electrical signals to the outside is formed on the seed layer 36, and the conductive ball 35 that has conductivity and the electrode 34a and an electrode 34b for controlling the movement of the conductive ball 35 are formed. Here, the terminal 33a, the terminal 33b, the electrode 34a and the electrode 34b are all electrically connected to the wires 40. Further, the enclosure 45 is formed so that the conductive ball 35 does not fly out, and the enclosure 45 is formed so as to enclose the electrode 34a, the electrode 34b and the conductive ball 35.

It is necessary for a height 41 from the surface of the insulating film 32 to the inner surface of the upper portion of the enclosure 45 to be greater than the diameter of the conductive ball 35 in order to ensure that the conductive ball 35 can freely move in the region enclosed by the electrodes 34.

It is also necessary for a height 42 from the upper surfaces of the electrode 34a and the electrode 34b to the inner surface of the upper portion of the enclosure 45 to be a height such that, no matter which position the inclination position sensor 100 is in, the conductive ball 35 does not emerge from the region enclosed by the plural electrodes 34. That is, it is necessary for the height 42 to be less than the diameter of the conductive ball 35 and equal to or greater than 0. More preferably, the height 42 may be equal to or greater than 0% and equal to or less than 40% of the diameter of the conductive ball 35. Further, as shown in FIG. 1C, it is preferable for the height 42 to be less than a width 46 of the electrodes 34 in order to ensure that the conducive ball 35 does not emerge outside the region enclosed by the plural electrodes 34 even when the electrodes 34 break at the root because of the impact of the conductive ball 35.

Further, it is preferable for a height 43 (equal to the height 41 minus the height 42) from the surface of the insulating film 32 of FIG. 1B to the upper surfaces of the electrode 34a and the electrode 34b to be greater than the radius of the conductive ball 35. When the height 43 is equal to or less than the diameter of the conductive ball 35, a problem arises in the impact resistance of the electrodes 34 because the conductive ball 35 contacts the end portions of the upper surfaces of the electrodes 34.

—Each Configural Site—

Each configural site of the inclination position sensor 100 of the present invention will be described in detail below.

[Electrodes]

The electrodes 34 in the present invention have a circular arc shape. Here, "circular arc" signifies part of a circumference, and the positions where the electrodes 34 contact the conductive ball 35 have a circular arc tendency.

For example, in FIG. 1A, the places where the electrodes 34 contact the conductive ball 35 have a circular arc shape because the electrodes 34 themselves are circular columns. Because the shapes of the electrodes 34 are circular column shapes as in FIG. 1A, the impact can be prevented from becoming locally concentrated in comparison to when the electrodes 34 have cornered shapes, whereby the impact resistance is improved.

Figure 2A:
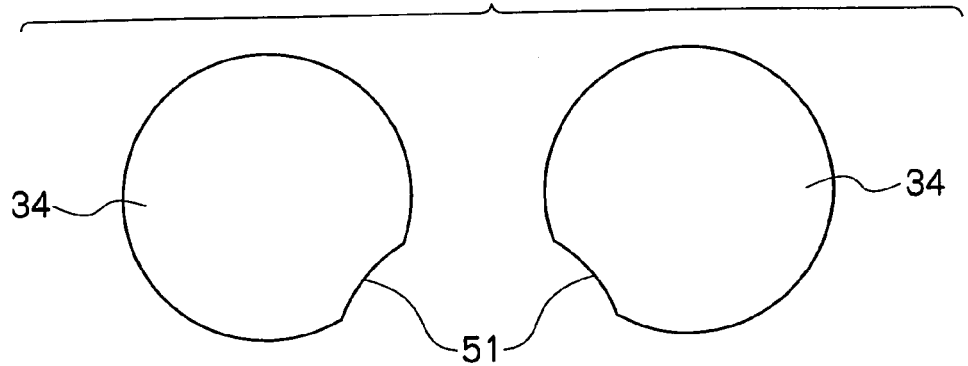
FIG. 2A is a diagram showing a preferred mode of electrodes in the inclination position sensor that is embodiment 1 of the present invention.

As shown in FIG. 2A, for example, it is preferable for the portions of the electrodes 34 that contact the conductive ball 35 to include circular arcs 51 corresponding to the conductive ball 35 in order to increase the area of contact between the electrodes 34 and the conductive ball 35. For example, when the electrodes 34 are seen from their upper surfaces, it is preferable for the electrodes 34 to have the shapes shown in FIG. 2A. In this manner, by increasing the area of contact between the conductive ball 35 and the electrodes 34, the impact resistance can be further improved.

Figure 2B:
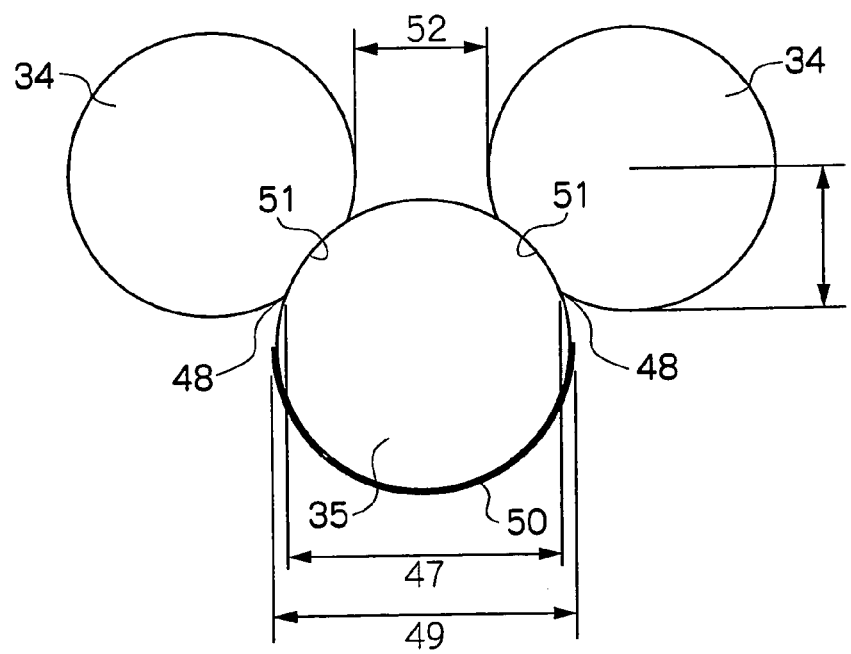
FIG. 2B is a top view of the inclination position sensor that is embodiment 1 of the present invention and shows when a conductive ball is contacting the electrodes.

FIG. 2B is a view showing a state where the conductive ball 35 is contacting the electrodes 34. As shown in FIG. 2B, it is necessary for a distance 47 between contacts 48 between the electrodes 34 and the conductive ball 35 to be less than a diameter 49 of the conductive ball 35. Moreover, in addition to this, it is necessary for the contacts 48 to not be in any position of a circular arc 50 on the opposite side of the electrodes 34 using as a boundary the diameter 49 of the conductive ball 48 drawn so as to be parallel to a straight line interconnecting the contacts 48 between the electrodes 34 and the conductive ball 35. When this condition is not satisfied, the surface of the conductive ball 35 becomes unable to contact the circular arcs 51 formed in the electrodes 34, the conductive ball 35 and the electrodes 34 point-contact each other at the contacts 48, and the impact resistance deteriorates.

Further, a distance 52 between the electrodes 34 is less than the diameter 49 of the conductive ball 35 in order to ensure that the conductive ball 35 simultaneously contacts two of the electrodes 34.

The material of the electrodes 34 is not particularly limited as long as it is a material having conductivity, but it is preferable for the material to be copper in consideration of the manufacturing process, such as ease of formation, and cost.

Further, in order to further improve the impact resistance, chamfered portions may be disposed in the contacts 48 of FIG. 2B, for example, in order to alleviate the impact that occurs when the later-described conductive ball 35 collides with the electrodes 34. Consequently, it is preferable for the chamfered portions to have a circular arc shape.

[Conductive Ball]

The inclination position sensor 100 of the present invention includes the conductive ball 35. The conductive ball 35 in the present invention is not particularly limited as long as it is conductive, and examples thereof may include a pure metal ball of Au or Cu, a lead-free solder ball of a Sn—Ag alloy or an Au—Sn alloy, and a composite ball comprising a copper core plated with solder.

It is preferable for the particle diameter of the conductive ball 35 to be 40 μm to 400 μm, and particularly preferably 50 μm to 100 μm, from the standpoint of making the inclination sensor compact.

When a composite ball is used, it is preferable for the thickness of the coated layer of solder to be equal to or less than 50 μm, but it is particularly preferable for the thickness to be 10% to 20% of the particle diameter.

The shape of the conductive ball 35 is not particularly limited as long as it is a shape capable of rolling, but it is preferably a sphere.

[Enclosure]

As shown in FIGS. 1A to 1C, the inclination position sensor 100 of the present invention includes the enclosure 45 for holding the aforementioned conductive ball 35 in the region enclosed by the aforementioned electrodes 34.

The enclosure 45 is formed on a wafer, with low-melting point glass or the like being disposed in advance on the adhesion portion when the enclosure 45 is adhered to the substrate 31. The wafer is placed in a predetermined position and adhered to the substrate 31 through a reflow process. Because of this process, mass productivity is improved in comparison to when the enclosure 45 is handled as this part.

The material of the enclosure 45 is dependent on the material of the substrate 31; examples thereof may include glass, silica, and silicon, and the material may also be metal.

The size of the enclosure 45 is not particularly limited as long as the enclosure 45 can cover the electrodes 34 and the conductive ball 35.

The position where the enclosure 45 is adhered to the substrate 31 may be between the electrodes 34 and the terminals 33, such as shown in FIG. 1B, for example.

Other than low-melting point glass, An-Sn solder or the like can also be used at the adhesion portion.

[Substrate, Oxide Film, Insulating Film, Wires]

Known materials can be used for the substrate 31, the oxide film 39, the insulating film 32 and the wires 40. For example, a silicon substrate may be used for the substrate 31, a silicon oxide film may be used for the oxide film 39, a polyimide may be used for the insulating film 32, and Cu or Al may be used for the wires 40.

In the inclination position sensor 100 of the present invention, the substrate 31 that can be appropriately used may have a shape where the portion in the center of the electrodes projects. When the substrate 31 includes a projecting portion, the conductive ball 35 always contacts the electrodes 34 even in a state where the inclination position sensor 100 is not inclined, so the initial value of the inclination of the inclination position sensor 100 can be instantaneously detected, and the sensitivity of the sensor is improved.

—Method of Manufacturing Inclination Position Sensor of Embodiment 1—

FIGS. 3A to 3G are cross-sectional views showing a method of manufacturing the inclination position sensor 100 of the present invention using a wafer level CSP technique (below, appropriately called "assembly process") that is a conventional semiconductor manufacturing technique.

Figure 3A:
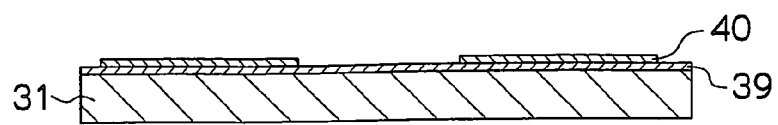
FIGS. 3A to 3G are cross-sectional views showing a method of manufacturing the inclination position sensor that is embodiment 1 of the present invention.
Figure 3B:
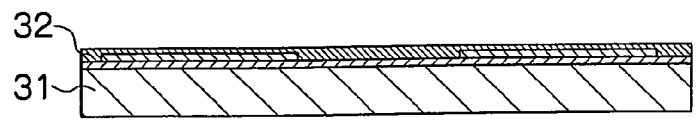
Figure 3C:
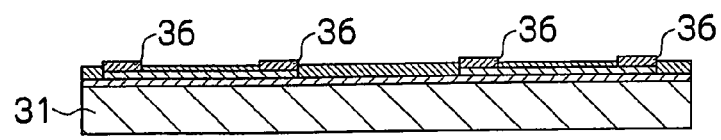
Figure 3D:
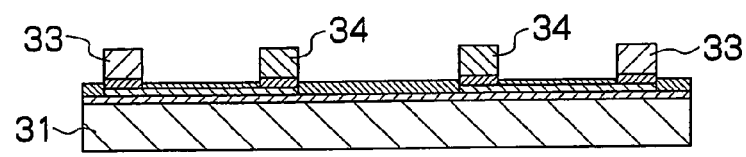
Figure 3E:
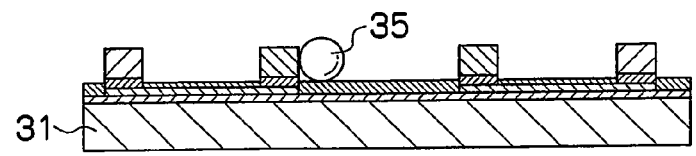
Figure 3F:
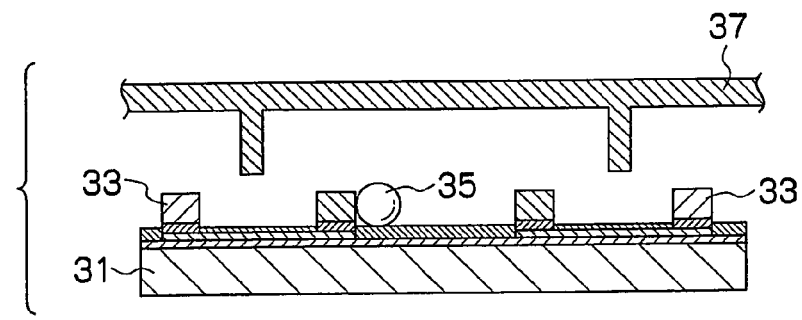
Figure 3G:
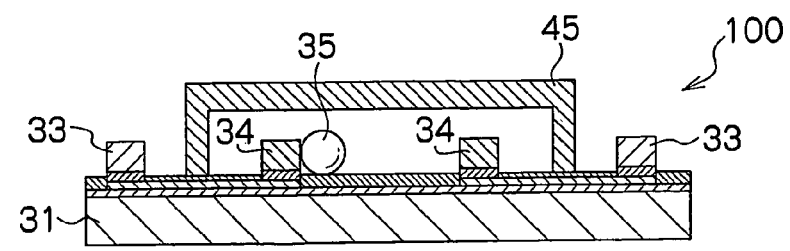

In FIG. 3A, the oxide film 39 and a metal film are sequentially formed on the surface of the substrate 31, and the wires 40 are formed by a lithography technique. In FIG. 3B, the insulating film 32 is formed so as to cover the wires 40 and the oxide film 39. In FIG. 3C, a pattern for forming electrodes is disposed on the insulating film 32 above the wires 40 by a lithography technique, and the seed layer 36 is formed. In FIG. 3D, the terminals 33 for leading electrical signals to the outside and the electrodes 34 for controlling the movement of the conductive ball 35 are formed by a plating technique on the seed layer 36. In FIG. 3E, the conductive ball 35 is disposed in the region enclosed by the electrodes 34. In FIG. 3F, a cap wafer 37 in which is formed an enclosure for covering the electrodes 34 and the conductive ball 35 is disposed. In FIG. 3G, the unnecessary portion of the cap wafer 37 is removed to dispose the enclosure 45. Next, although it is not illustrated, the wafer is diced so that respective inclination position sensors 100 are completed.

In this manner, plural inclination position sensors can be simultaneously formed on a single wafer by an assembly process, so the inclination position sensor of the present invention has excellent mass productivity, and it becomes possible to reduce the cost of the sensor.

<Embodiment 2>

[Inclination Position Sensor of Embodiment 2]

FIG. 4A is a top view of an inclination position sensor 200 of the present invention manufactured using a manufacturing method shown in FIGS. 6A to 6E. FIG. 4B is a cross-sectional view along A-A in FIG. 4A of the inclination position sensor 200 of the present invention. FIG. 4C is a top view when the inclination position sensor 200 has been inclined in a vertical direction. It will be noted that FIGS. 4A and 4C are top views when a lid 71 has been made semi-transparent in order to make clear the internal structure of the inclination position sensor 200.

Turning now to FIG. 4A, eight electrodes 69 are formed inside a header 75 comprising substrates 60, 65 and 67. The electrodes 69 and the spaces between the electrodes have a circular arc shape 92 matching the circumference of a conductive ball 70, and the intervals between each of the electrodes 69 are set to be intervals where the conductive ball 70 can simultaneously contact any arbitrary neighboring two of the electrodes 69. A concavo-convex portion 88 of the substrate is formed. A concave portion 98 is formed and includes the opening that the conductive ball 70 is placed within. The concavo-convex portion 88 includes side surfaces 96 that include circular arcs 92, and further side surfaces 94 that do not include circular arcs 92.

Further, as for the principle of operation, as shown in FIG. 4C, for example, when the inclination position sensor 200 is inclined in a vertical direction, the conductive ball 70 contacts an electrode 69a and an electrode 69b. At this time, the electrode 69a and the electrode 69b are electrically interconnected because the conductive ball 70 has conductivity. An external detection circuit (not shown) detects this electrically connected state through inner wires 76 comprising via conductors 64 and via conductors 66 electrically connected to the electrodes 69' and a conductor film 63 electrically connected to the inner wires 76. Thus, it can be detected that that the inclination position sensor 200 is in a vertical direction, that is, that the electrode 69a and the electrode 69b are on the bottom.

In this manner, the inclination position sensor 200 of the present invention can detect eight inclinations of 0°, 45°, 90°, 135°, 180°, 225°, 270° and 315°.

Further, turning now to FIG. 4B, the inclination position sensor 200 of the present invention is configured by: the header 75 comprising the substrate 60, the substrate 65 and the substrate 67; the electrodes 69; the conductor film 63 serving as a connecting portion of electrical signals with the external detection circuit (not shown) formed on the outer peripheral bottom surface of the inclination position sensor 200; the inner wires 76 comprising the via conductors 64 and the via conductors 66 that electrically interconnect the electrodes 69 and the conductor film 63; a space 72 formed by the header 75, the lid 71 and the electrodes 69; and the conductive ball 70 disposed in the space 72.

Here, the relationship between a distance 73 between the bottom surface of the lid 71 and the electrodes 69 and a total height 74 that is equal to the sum of the film thickness of the substrate 65 and the film thickness of the electrodes 69 is the same as that of the height 41 from the surface of the insulating film 32 to the inner surface of the upper portion of the enclosure 45 and the height 42 from the upper surfaces of the electrode 34a and the electrode 34b to the inner surface of the upper portion of the enclosure 45, which was described in FIG. 1B of embodiment 1.

—Each Configural Site—

Each configural site of the inclination position sensor 200 of the present invention will be described in detail below.

[Electrodes]

The electrodes 69 in the present invention have a circular arc shape. Here, "circular arc" has the same meaning as in embodiment 1.

For example, in FIG. 4A, it is preferable for the electrodes 69 to have a shape gouged out by the conductive ball 70 in order to increase the area of contact between the conductive ball 70 and the electrodes 69. For example, when the electrodes 69 are seen from their upper surfaces, it is preferable for the electrodes 69 to have the shape shown in FIG. 4A. In this manner, by increasing the area of contact between the conductive ball 70 and the electrodes 69, the impact resistance can be further improved.

Figure 5:
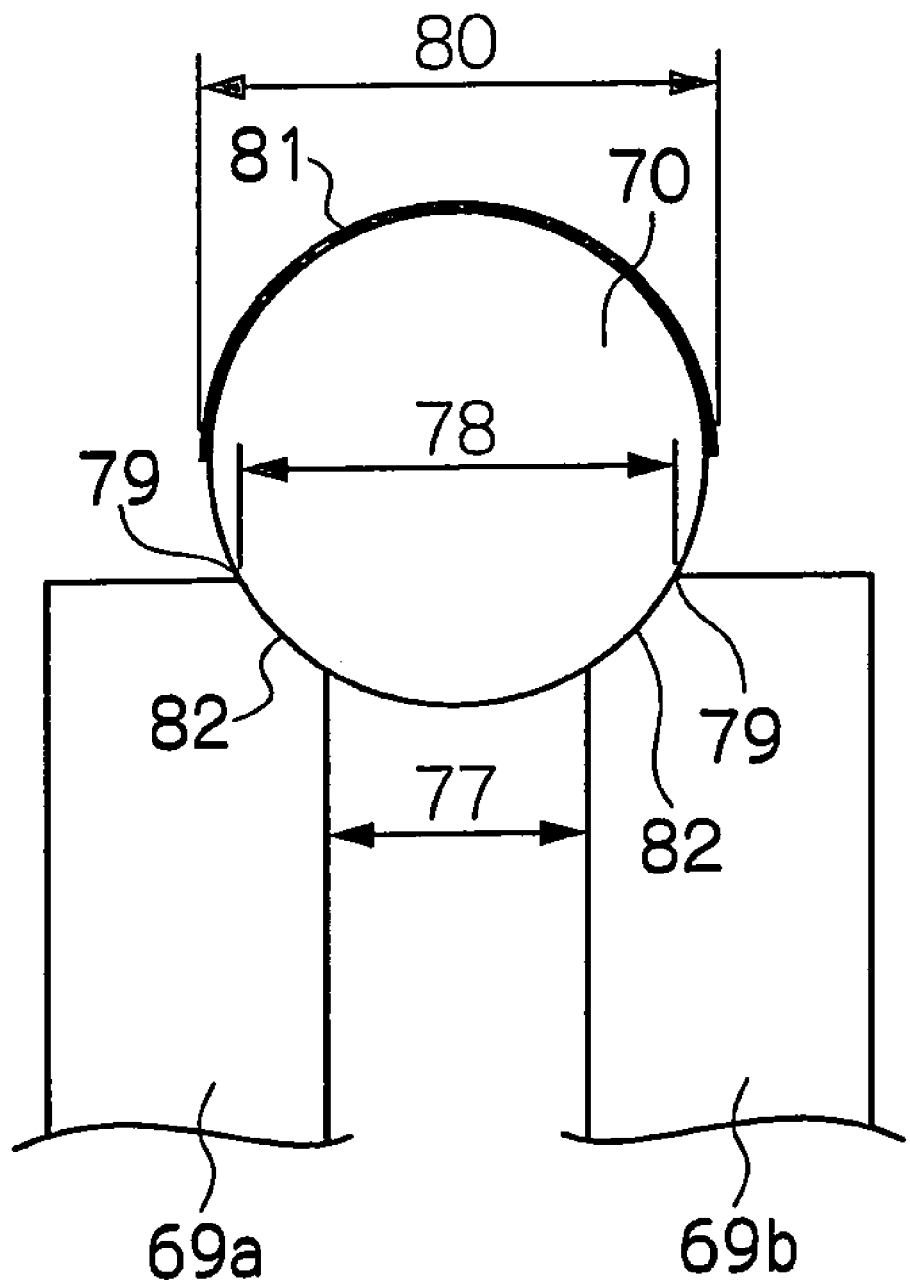
FIG. 5 is a top view of the inclination position sensor that is embodiment 2 of the present invention and shows when a conductive ball is contacting electrodes.

FIG. 5 is a view showing a state where the conductive ball 70 is contacting the electrodes 69. As shown in FIG. 5, it is necessary for a distance 78 between contacts 79 between the electrodes 69a and 69b and the conductive ball 70 to be less than a diameter 80 of the conductive ball 70. Moreover, in addition to this, it is necessary for the contacts 79 to not be in any position of a circular arc 81 on the opposite side of the electrodes 69a and 69b using as a boundary the diameter 80 of the conductive ball 70 drawn so as to be parallel to a straight line interconnecting the contacts 79 between the electrodes 69a and 69b and the conductive ball 70. When this condition is not satisfied, the surface of the conductive ball 70 becomes unable to contact circular arcs 82 formed in the electrodes 69a and 69b, so the conductive ball 70 and the electrodes 69a and 69b point-contact each other at the contacts 79, and the impact resistance deteriorates.

In order to further improve the impact resistance, chamfered portions may be disposed in the contacts 79 of FIG. 5, for example, in order to alleviate the impact that occurs when the later-described conductive ball 70 collides with the electrodes 69. Consequently, it is preferable for the chamfered portions to have a circular arc shape.

Further, a distance 77 between the electrodes 69a and 69b is less than the diameter 80 of the conductive ball 70 in order to ensure that the conductive ball 70 simultaneously contacts the electrodes 69a and 69b.

The material of the electrodes 69 is not particularly limited as long as it is a material having conductivity, but it is preferable for the material to be copper in consideration of the manufacturing process, such as ease of formation, and cost.

Examples of the material of the electrodes 69 may include Ag and Cu.

[Substrates]

The substrates 60, 65 and 67 are insulating substrates and are preferably low-temperature co-fired ceramic (LTCC) substrates from the standpoint of impact resistance and multi-layer laminability.

It is preferable for the film thickness of the substrates before lamination to be 100 μm to 300 μm from the standpoint of workability.

Known materials can be used for the material; for example, crystallized glass comprising a combination of alumina and borosilicate glass can be used.

With respect to the lamination conditions of the substrates, the substrates can be co-fired at a low temperature of 900° C. or less, for example. When Ag or Cu is used for the wires, the wires and the substrates can be co-fired simultaneously.

In the inclination position sensor 200 of the present invention, the substrates that can be appropriately used may have a shape where the portion in the center of the electrodes projects. When the substrates include a projecting portion, the conductive ball 70 always contacts the electrodes 69 even in a state where the inclination position sensor 200 is not inclined, so the initial value of the inclination of the inclination position sensor can be instantaneously detected, and the sensitivity of the sensor is improved.

[Lid]

The lid 71 in the inclination position sensor 200 of the present invention is disposed so that the conductive ball 70 can move in the space 72.

The material of the lid 71 is not particularly limited and may be the same oxide, metal or glass as the substrates mentioned above.

In order to adhere the lid 71 and the header 75 to each other, an adhesive such as low-melting point glass or An-Su solder may be disposed in advance on the surfaces where the lid 71 and the header 75 contact each other, placed in a predetermined position, and adhered by the reflow process.

[Conductor Film, Inner Wires, Conductive Ball]

The conductor film 63, the inner wires 76 and the conductive ball 70 are the same materials and have the same shapes as the electrodes and conductive ball described in embodiment 1.

—Method of Manufacturing Inclination Position Sensor of Embodiment 2—

FIGS. 6A to 6E are cross-sectional views showing a method of manufacturing the inclination position sensor 200 of the present invention using a substrate laminating technique (below, appropriately called "package process").

Figure 6A:
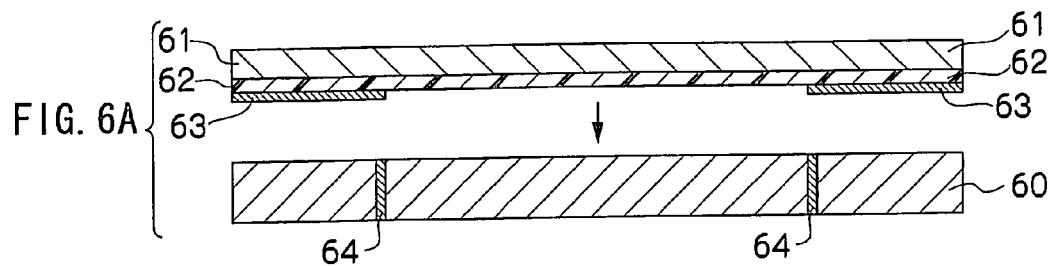
FIGS. 6A to 6E are cross-sectional views showing a method of manufacturing the inclination position sensor that is embodiment 2 of the present invention.
Figure 6B:
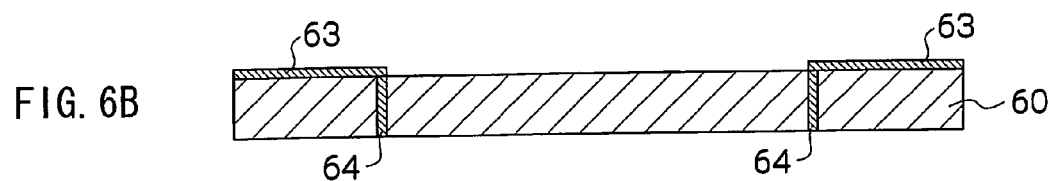
Figure 6C:
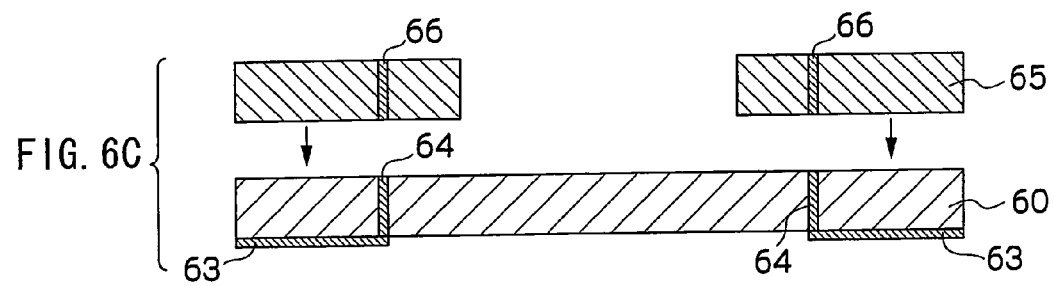
Figure 6D:
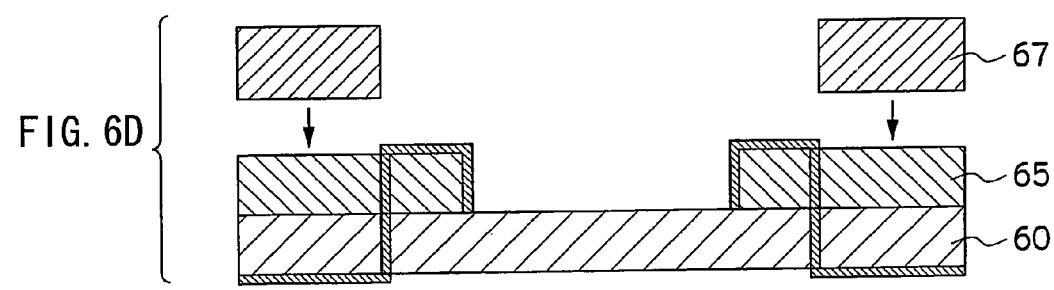
Figure 6E:
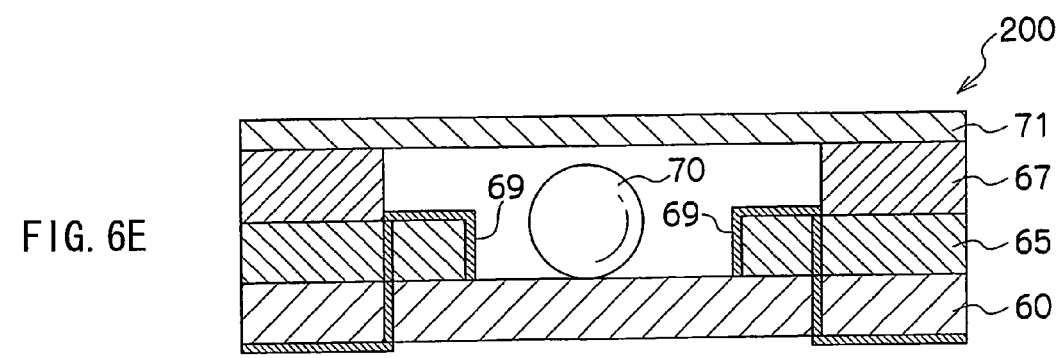
Figure 7A:
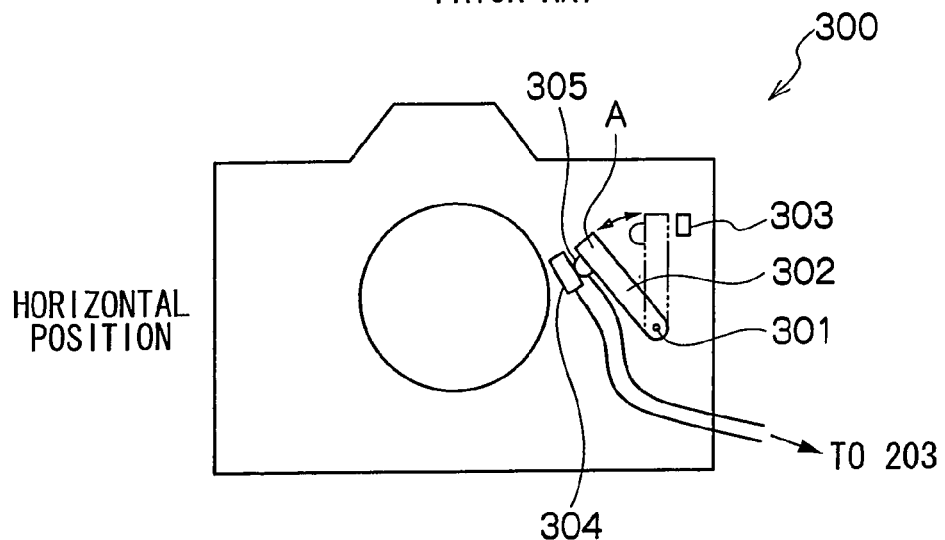
FIGS. 7A and 7B are cross-sectional views of a conventional inclination position sensor.
Figure 7B:
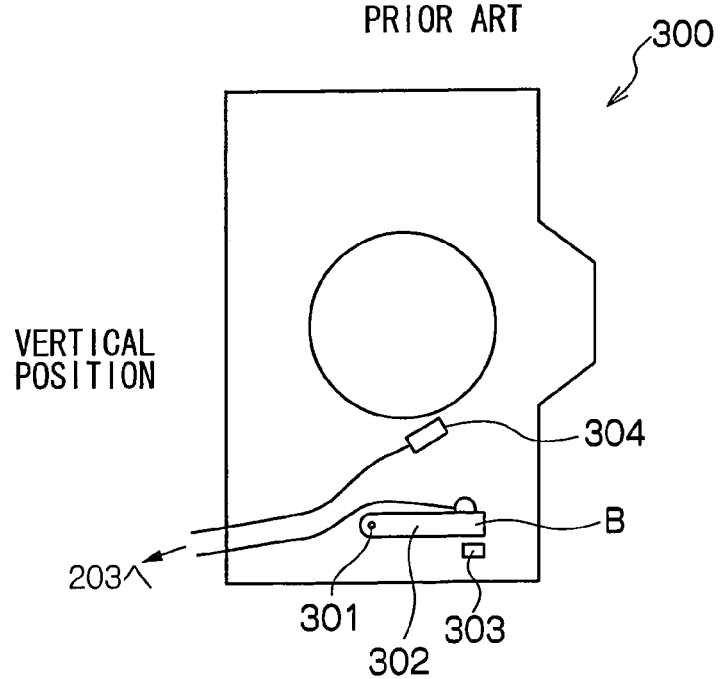

In FIG. 6A, the via conductors 64 are formed by a known screening technique in predetermined positions in the substrate 60. Meanwhile, a polymer film 61 to which a thermoplastic resin 62 has been adhered and on which the conductor films 63 have been formed by a plating technique is prepared. In FIG. 6B, the conductor films 63 are transferred onto the substrate 60 such that the conductor films 63 and the via conductors 64 become electrically interconnected. In FIG. 6C, a hole is formed between the via conductors 66 in the substrate 65 in which the via conductors 66 are formed, and the substrate 65 in which the via conductors 66 are formed is laminated on the substrate 60 such that the via conductors 64 and the via conductors 66 become electrically interconnected. In FIG. 6D, a hole is formed in the substrate 67, and the substrate 67 is laminated on the substrate 65 so that the header of the inclination position sensor 200 can be formed. In FIG. 6E, the electrodes 69 are formed on the portions where the surface of the substrate 65 is exposed such that the electrodes 69 become electrically connected to the via conductors 66, the conductor ball 70 is disposed, and thereafter the lid 71 is adhered to the substrate 67 with an adhesive or the like. Next, although it is not illustrated, the substrate is diced so that respective inclination position sensors 200 are completed.

In this manner, plural inclination position sensors can be simultaneously formed on a single substrate by a package process, so the inclination position sensor of the present invention has excellent mass productivity, and it becomes possible to reduce the cost of the sensor.

<Embodiment 3>

Embodiment 3 of the present invention has a configuration where an insulating liquid fills the region covered by the enclosure of the inclination position sensors described in embodiment 1 and embodiment 2.

By filling the region with an insulating liquid, the impact when the conductor ball contacts the electrodes can be alleviated by a damping effect.

[Insulating Liquid]

It is necessary for the insulating liquid filling the movable region of the conductor ball to be corrosive and have a viscosity to the extent that it can control the speed of the conductor ball.

The viscosity can be appropriately selected depending on the mass and speed of the ball, but it is preferable for the viscosity to be 10 mm$^2$/s to 100 mm$^2$/s. Examples of such an insulating liquid include silicone oil.

With respect to the method of filling the region with the insulating liquid, in embodiment 1, the steps of adhering the enclosure 45 having a hole for injecting oil in part of the upper surface thereof, injecting oil by a dispenser from that hole, and then sealing the hole with a potting material may be sequentially performed. Further, in embodiment 2, the steps of injecting oil by a dispenser into the space just before adhering the lid to the header, covering the header with the lid replete with an adhesive, and then adhering the lid to the header by reflow may be sequentially performed.

The inclination position sensors of embodiment 1 and embodiment 2 produced in this manner can be manufactured by a package process or an assembly process and have excellent mass productivity. Moreover, because the electrodes have a circular arc shape, the electrodes alleviate the impact that occurs when the conductor ball contacts them and they have excellent impact resistance. Furthermore, in the inclination position sensor of embodiment 3, by filling the region covered by the enclosure used in the inclination position sensors of embodiment 1 and embodiment 2, that is, the movable region of the conductor ball, with an insulating liquid, the impact imparted by the conductor ball can be contained and the impact resistance can be improved.

It will be noted that these embodiments should not be construed in a limited way and are of course implementable within a range that satisfies the requirements of the invention.

What is claimed is:

1. An inclination position sensor, comprising:
   a laminated multilayer substrate having a concavo-convex portion, the concavo-convex portion having a side surface that includes a circular arc, and a further side surface that does not have a circular arc;
   a plurality of inner wires, each extending to the side surface that does not include the circular arc;
   a plurality of electrodes disposed on the surface of the side that includes the circular arc and on an upper surface of the concavo-convex portion, each electrode being electrically connected to a respective inner wire;
   a conductive ball disposed in a concave portion of the substrate; and
   a lid that forms an enclosure with the multilayer substrate and that covers the electrodes and the conductive ball.

2. The inclination position sensor recited in claim 1, wherein said laminated multilayer substrate comprises first, second and third insulating substrates.

3. The inclination position sensor recited in claim 2, wherein said first, second and third insulating substrates are low-temperature co-fired ceramic substrates.

4. The inclination position sensor recited in claim 3, wherein said first, second and third insulating substrates are crystallized glass comprising a combination of alumina and borosilicate glass.

5. The inclination position sensor recited in claim 2, wherein said first, second and third insulating substrates are crystallized glass comprising a combination of alumina and borosilicate glass.

6. The inclination position sensor recited in claim 1, wherein each electrode is separated from an adjacent electrode by a space.

7. The inclination position sensor recited in claim 6, wherein each pair of adjacent electrodes jointly has a circular arc shape that matches a circumference of the conductive ball.

8. The inclination position sensor recited in claim 6, wherein the space is less than a diameter of the conductive ball.

9. The inclination position sensor recited in claim 1, wherein there are eight electrodes spaced apart from each other, so that inclinations of 0, 45, 90, 135, 180, 225, 270 and 315 degrees can be detected.

10. The inclination position sensor recited in claim 1, wherein said wires and said electrodes are comprised of Ag or Cu.

11. The inclination position sensor recited in claim 1, wherein said lid is comprised of a same material as said substrate.

12. The inclination position sensor recited in claim 1, wherein said lid is adhered to said substrate using a low-melting point glass or An-Su solder.

13. The inclination position sensor recited in claim 1, further comprising an insulating liquid that fills the enclosure.

14. The inclination position sensor recited in claim 13, wherein the insulating liquid comprises silicone oil.

15. The inclination position sensor recited in claim 13, wherein the insulating liquid has a viscosity of about 10 mm$^2$/s to about 100 mm$^2$/s.

* * * * *